United States Patent
Harris

(10) Patent No.: US 9,687,008 B1
(45) Date of Patent: Jun. 27, 2017

(54) FISH DESCALING TOOL

(71) Applicant: Carl Harris, Dolton, IL (US)

(72) Inventor: Carl Harris, Dolton, IL (US)

( * ) Notice: Subject to any disclaimer, the term of this patent is extended or adjusted under 35 U.S.C. 154(b) by 0 days.

(21) Appl. No.: 15/284,692

(22) Filed: Oct. 4, 2016

(51) Int. Cl.
| | |
|---|---|
| *A22C 25/00* | (2006.01) |
| *A22C 25/02* | (2006.01) |
| *H02K 7/14* | (2006.01) |
| *H02K 7/00* | (2006.01) |
| *H02K 11/28* | (2016.01) |

(52) U.S. Cl.
CPC .......... *A22C 25/025* (2013.01); *A22C 25/006* (2013.01); *H02K 7/003* (2013.01); *H02K 7/145* (2013.01); *H02K 11/28* (2016.01)

(58) Field of Classification Search
CPC ....... A22C 25/00; A22C 25/006; A22C 25/02; A22C 25/17
USPC .......................... 452/6, 98, 99, 101, 102–105
See application file for complete search history.

(56) References Cited

U.S. PATENT DOCUMENTS

| | | | | |
|---|---|---|---|---|
| 1,722,902 A | * | 7/1929 | Carney | A22B 5/10 |
| | | | | 30/276 |
| 1,758,675 A | * | 5/1930 | Reilly | A22C 25/02 |
| | | | | 452/101 |
| 2,573,601 A | * | 10/1951 | Rathmell | A22C 25/006 |
| | | | | 15/105 |
| 2,672,648 A | * | 3/1954 | Kaplan | A22C 25/02 |
| | | | | 452/99 |
| D205,884 S | * | 10/1966 | Canion | 452/105 |
| 3,328,834 A | * | 7/1967 | Pulcifer | A22C 25/025 |
| | | | | 452/101 |
| 3,835,504 A | | 9/1974 | Tripodi | |
| 4,107,819 A | | 8/1978 | Saizon | |
| 4,490,885 A | | 1/1985 | Iskiw | |
| 4,574,432 A | * | 3/1986 | Jacob | A22C 21/02 |
| | | | | 452/101 |
| 4,619,019 A | * | 10/1986 | Hardy | A22C 25/02 |
| | | | | 452/101 |
| 5,221,229 A | * | 6/1993 | Brophy | A22C 25/02 |
| | | | | 452/101 |
| 5,232,395 A | * | 8/1993 | Rushing | A22C 25/025 |
| | | | | 30/169 |
| 5,630,750 A | * | 5/1997 | Byrd | A22C 25/02 |
| | | | | 452/101 |
| 7,618,308 B1 | * | 11/2009 | Hernandez | A22C 25/02 |
| | | | | 452/99 |
| 8,342,917 B2 | | 1/2013 | Byrd | |
| 2003/0143939 A1 | * | 7/2003 | Barlow | A22C 25/025 |
| | | | | 452/101 |

FOREIGN PATENT DOCUMENTS

CN          203969063 U       12/2014

* cited by examiner

*Primary Examiner* — Richard Price, Jr.

(57) ABSTRACT

The fish descaling tool is adapted for use with a fish. Specifically, the fish descaling tool is a hand held device that is designed to remove scales from fish. The fish descaling tool is an electrically powered device that rotates a scaling cylinder in such a manner that the scaling cylinder will remove the scales of the fish without damaging the underlying flesh of the fish. The fish descaling tool comprises a scaling cylinder, a hood, a handle, a motor, and a power source.

11 Claims, 5 Drawing Sheets

FISH DESCALING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of processing of poultry or fish, more specifically, an electrically powered hand held tool adapted for use in scaling fish.

SUMMARY OF INVENTION

The fish descaling tool is adapted for use with a fish. Specifically, the fish descaling tool is a hand held device that is designed to remove scales from fish. The fish descaling tool is an electrically powered device that rotates a scaling cylinder in such a manner that the scaling cylinder will remove the scales of the fish without damaging the underlying flesh of the fish.

These together with additional objects, features and advantages of the fish descaling tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the fish descaling tool in detail, it is to be understood that the fish descaling tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fish descaling tool.

It is therefore important that the claims be regarded as including such equivalent construction insofar as they do not depart from the spirit and scope of the fish descaling tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figures 1, 2:
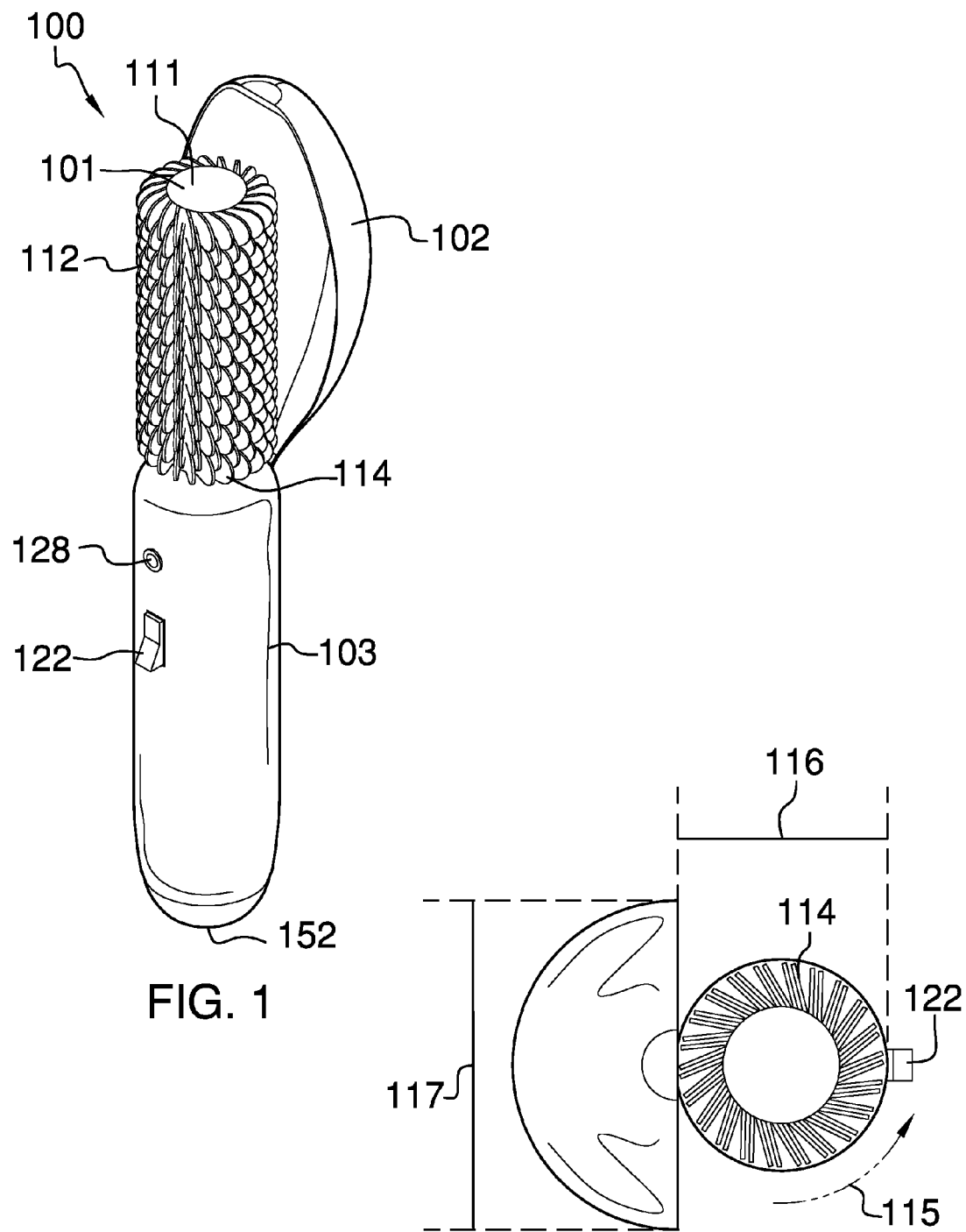
FIG. 1 is a perspective view of an embodiment of the disclosure.
FIG. 2 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The fish descaling tool 100 (hereinafter invention) comprises a scaling cylinder 101, a hood 102, a handle 103, a motor 104, and a power source 105. The invention 100 is adapted for use with a fish 131. Specifically, the invention 100 is a hand held device that is designed to remove scales 132 from fish 131. The invention 100 is an electrically powered device that rotates a scaling cylinder 101 in such a manner that the scaling cylinder 101 will remove the scales 132 of the fish 131 without damaging the underlying flesh of the fish 131.

The scaling cylinder 101 comprises a base 111, a plurality of spatulas 112, and a shaft connection 113. The scaling cylinder 101 is further defined with an outer diameter 116 and a direction of rotation 115. The base 111 is a cylindrical structure upon which the plurality of spatulas 112 are mounted. As shown most clearly in FIGS. 2 and 6, each individual spatula 114 selected from the plurality of spatulas 112 is mounted on the base 111 such that each individual spatula 114 projects away from the center axis of the base 111 at an acute angle 142 that is not perpendicular to the tangent plane 141 of the surface, also commonly referred to as the face, of the base 111.

Figure 6:
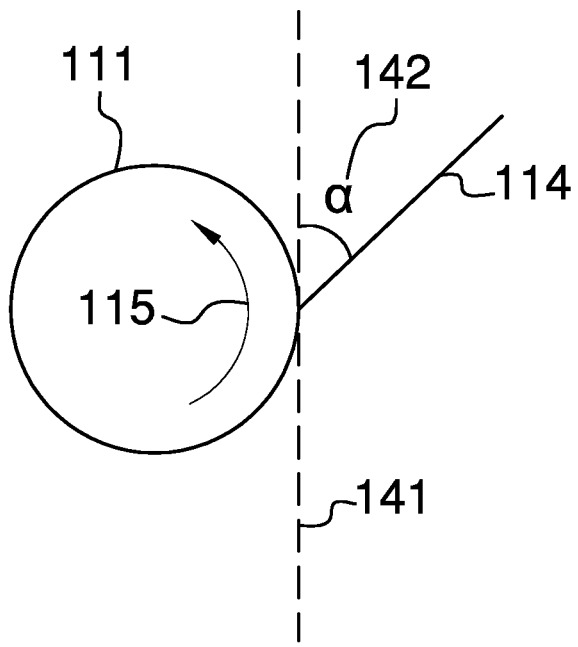
FIG. 6 is a detail view of an embodiment of the disclosure.
Figure 7:
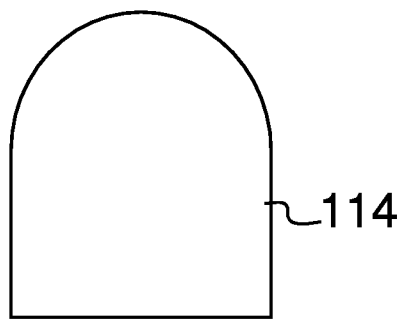
FIG. 7 is a detail view of an embodiment of the disclosure.

As shown most clearly in FIG. 6, the direction of rotation 115 of the base 111 is such that each individual spatula 114 moves towards the acute angle 142 during operation of the invention 100. The scaling cylinder 101 is further fitted with a shaft connection 113. The shaft connection 113 attaches the scaling cylinder 101 to the motor 104. Methods and techniques to attach objects to motor shafts are well known and documented in the mechanical arts. While the motor 104 is discussed in more detail elsewhere in this disclosure, the purpose of the motor 104 is to rotate the scaling cylinder

101. As shown most clearly in FIG. 7, each individual spatula 114 is formed in the shape of a spatula.

As shown most clearly in FIG. 2, the hood 102 is a hollow semi-cylindrical structure that contains a portion of the scaling cylinder 101. The purpose of the hood 102 is to act as a barrier that prevents the discharge of fish 131 scales 132 towards the user of the invention 100. The hood 102 is attached to the first end 151 of the handle 103. The span of the inner diameter 117 of the hood 102 is greater than the span of the outer diameter 116 of the scaling cylinder 101 such that a portion of the scaling cylinder 101 will fit within the hood 102 thus improving the efficacy of the barrier formed by the hood 102.

Figure 3:
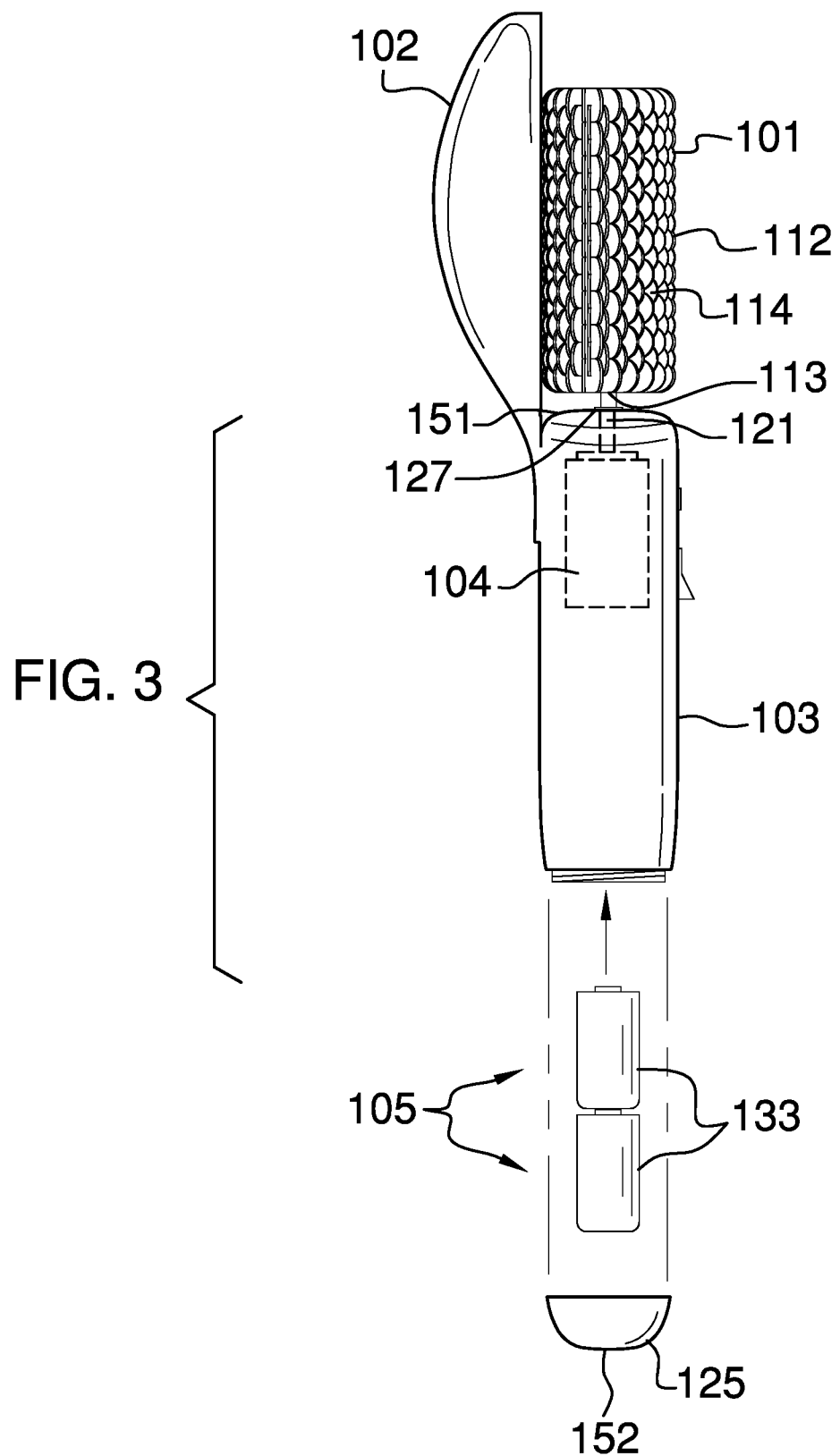
FIG. 3 is a side view of an embodiment of the disclosure.
Figure 4:
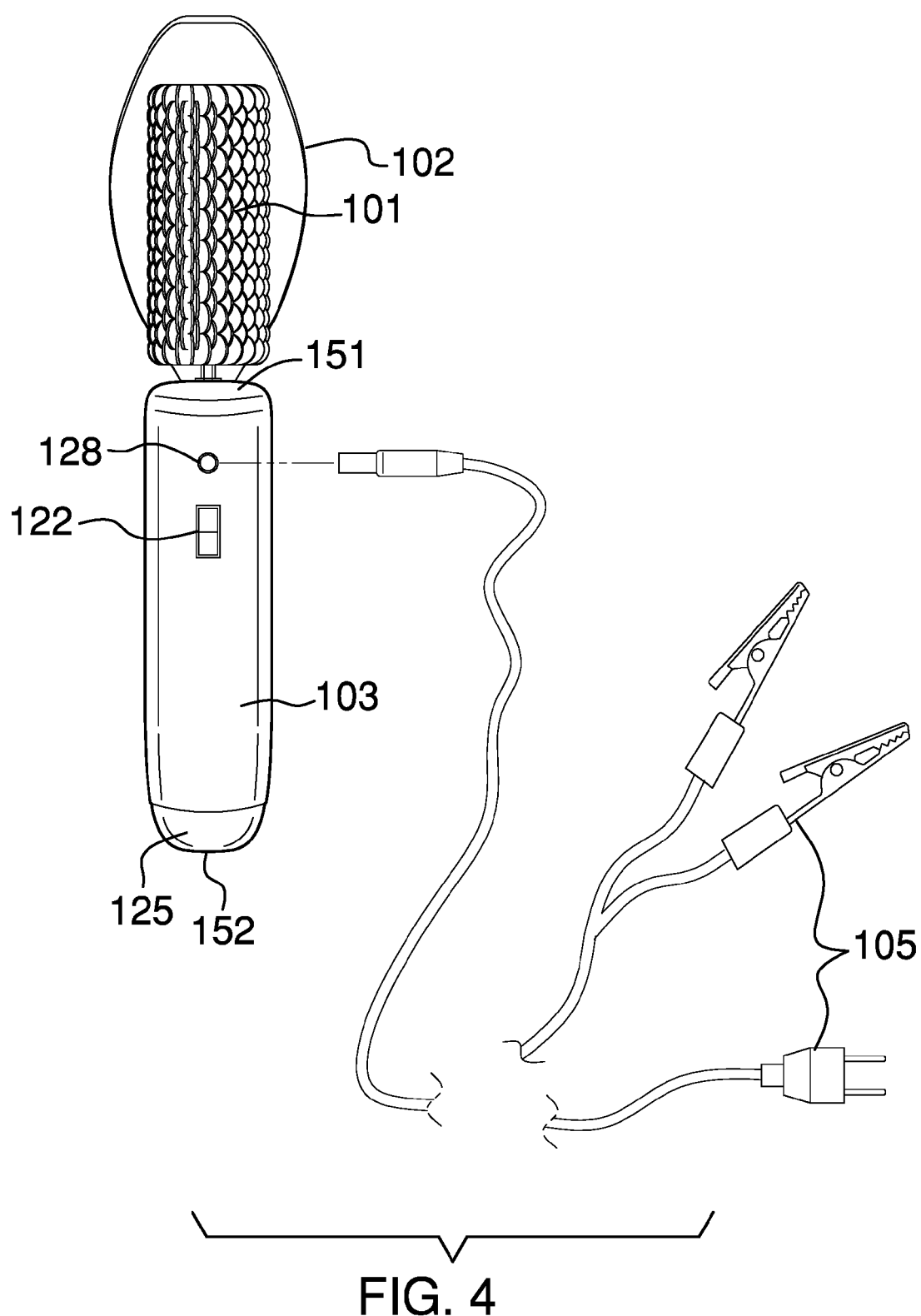
FIG. 4 is a front view of an embodiment of the disclosure.
Figure 5:
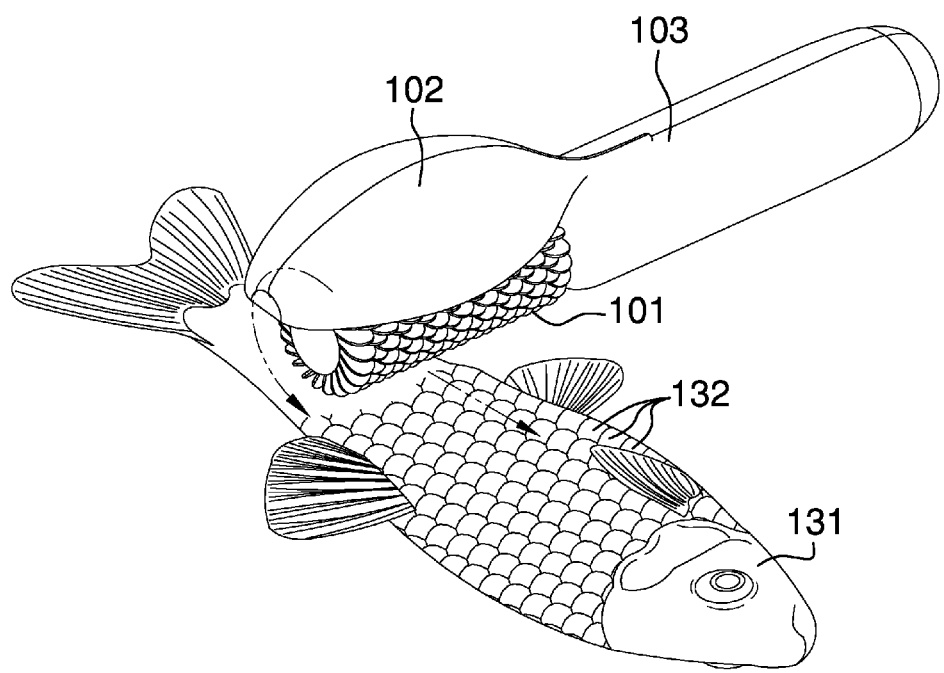
FIG. 5 is an in use view of an embodiment of the disclosure.

As shown most clearly in FIG. 3, the motor 104 is a commercially available electric motor that further comprises a motor shaft 121 and a switch 122. The motor 104 rotates the motor shaft 121. The motor shaft 121 is connected to the scaling cylinder 101 such that the motor 104 will rotate the scaling cylinder 101 in the proper direction of rotation 115. The switch 122 is a commercially available electrical component that controls electric current flow into the motor 104 in a manner that powers the invention 100 on and off. As shown most clearly in FIG. 1, the switch 122 is mounted on the handle 103 such that the switch 122 can be operated by the user.

The handle 103 is a hollow cylindrical structure that contains the motor 104 and the power source 105. The handle 103 is further defined with a first end 151 and a second end 152. As shown most clearly in FIG. 3, the second end 152 further comprises a removable cap 125 such that a battery 133 can be inserted into the handle 103. Once the battery 133 is inserted, the cap 125 can be replaced to hold the battery 133 in position. The motor 104 is mounted in the first end 151 of the handle 103 such that the motor shaft 121 projects through an aperture 127 formed in the first end 151 of the handle 103 thus providing access to the motor shaft 121 by the scaling cylinder 101. The aperture 127 is a hole that is formed in the first end 151 of the handle 103.

Figure 8:
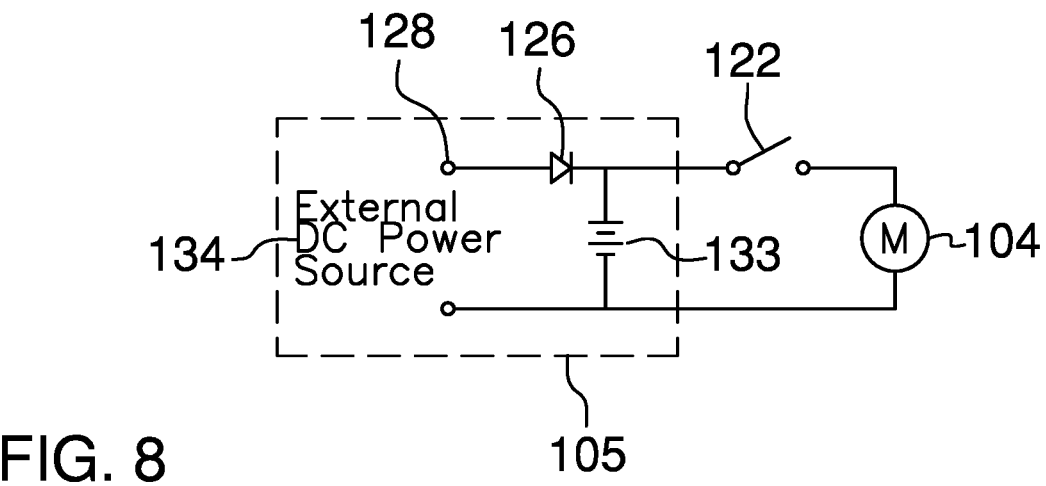
FIG. 8 is a schematic view of an embodiment of the disclosure.

As shown most clearly in FIG. 1, the switch 122 and the motor 104 are connected in series with a power source 105. The purpose of the power source 105 is to provide the electrical energy needed by the motor 104 to rotate the scaling cylinder 101. The electric power source 105 further comprises the battery 133 and a port 128. The battery 133 comprises one or more commercially available batteries. As shown in FIG. 1, the port 128 is provided to receive electricity from the external DC power source 134. As shown in FIG. 8, the terminals of the port 128 are wired in parallel to the battery 133. The external DC power source 134 is a commercially available power source that is designed to provide the voltage and current required to operate the invention 100 in a manner that is beyond the scope of this disclosure. As shown most clearly in FIG. 8, a diode 126 is inserted between the external DC power source 134 and the battery 133 in a manner that prevents the accidental discharge of electricity from the battery 133 through the port 128.

To use the invention 100, the switch 122 is placed in the closed position and the scaling cylinder 101 is placed next to a fish 131 such that the direction of rotation 115 of the scaling cylinder 101 moves against the shingle pattern of the scales 132 of the fish 131.

In the first potential embodiment of the disclosure, the scaling cylinder 101 is molded as a single unit from molded plastic. Suitable plastics include, but are not limited to, polyethylene, polypropylene, or polyvinylchloride. The hood 102 and the handle 103 are molded as a single unit from molded plastic. The remaining components described in this disclosure are readily and commercially available and their use is well known to those skilled in the electrical or mechanical arts.

The following definitions were used in this disclosure:

Battery: As used in this disclosure, a battery is a container consisting of one or more cells, in which chemical energy is converted into electricity and used as a source of power.

Blade: As used in this disclosure, a blade is a term that is used to describe: 1) a wide and flat portion of a structure; or, 2) the cutting edge of a tool.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Cylinder: As used in this disclosure, a cylinder is a geometric structure defined by two identical flat and parallel ends, also commonly referred to as bases, which are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

DC: As used in this disclosure, DC is an acronym for direct current.

Diode: As used in this disclosure, a diode is a two terminal semiconductor device that allows current flow in only one direction. The two terminals are called the anode and the cathode.

Electric Motor: In this disclosure, an electric motor is a machine that converts electric energy into rotational mechanical energy.

Inner Diameter: As used in this disclosure, the term inner diameter is used in the same way that a plumber would refer to the inner diameter of a pipe.

Motor: As used in this disclosure, a motor refers to the method of transferring energy from the external power source into mechanical energy.

Outer Diameter: As used in this disclosure, the term outer diameter is used in the same way that a plumber would refer to the outer diameter of a pipe.

Port: As used in this disclosure, a port is an electrical termination that is used to connect a first electrical circuit to a second external electrical circuit. In this disclosure, the port is designed to receive a plug.

Shaft: As used in this disclosure, the term shaft is used to describe a rigid cylinder that is often used as the handle of a tool or implement. The terms inner diameter of the shaft and outer diameter of the shaft are used as they would be used by those skilled in the plumbing arts. The definition of shaft explicitly includes solid shafts or shafts that are formed more like pipes with a hollow passage through the shaft that runs along the center axis of the shaft cylinder.

Spatula: As used in this disclosure, a spatula is a roughly rectangular object that: 1) has a flat appearance in one dimension relative to the other two dimensions; and 2) has one rounded edge formed in the shape of a semicircle. The body of the spatula is referred to as the blade or paddle of the spatula. If a surface of the spatula is not confined to a plane, the spatula is said to be offset.

Switch: As used in this disclosure, a switch is an electrical device that starts and stops the flow of electricity through an electric circuit.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tool for processing fish comprising:
a scaling cylinder, a hood, a handle, a motor, and a power source;
wherein the tool for processing fish is adapted for use with a fish;
wherein the tool for processing fish is a hand held device;
wherein the tool for processing fish remove scales from the fish;
wherein the tool for processing fish is an electrically powered device;
wherein the motor and the power source are mounted within the handle;
wherein the hood is attached to the handle;
wherein the scaling cylinder is attached to the motor;
wherein the scaling cylinder comprises a base and a plurality of spatulas;
wherein the scaling cylinder is further defined with an outer diameter and a direction of rotation;
wherein the base is a cylindrical structure upon which the plurality of spatulas are mounted;
wherein the shaft connection is mounted on the base;
wherein the plurality of spatulas comprises a collection of individual spatulas;
wherein each individual spatula selected from the plurality of spatulas is mounted on the base such that each individual spatula projects away from the center axis of the base;
wherein each individual spatula forms an acute angle;
wherein the direction of rotation of the scaling cylinder is such that each individual spatula moves towards the acute angle;
wherein each individual spatula is formed in the shape of a spatula;
wherein the scaling cylinder further comprises a shaft connection;
wherein the shaft connection is formed in the base;
wherein the shaft connection attaches the scaling cylinder to the motor;
wherein the hood is a hollow semi-cylindrical structure;
wherein the handle is a hollow cylindrical structure;
wherein the handle is further defined with a first end and a second end;
wherein the second end of the handle further comprises a removable cap.

2. The tool for processing fish according to claim 1 wherein the span of the inner diameter of the hood is greater than the span of the outer diameter of the scaling cylinder such that a portion of the scaling cylinder will fit within the hood.

3. The tool for processing fish according to claim 2 wherein the motor is an electric motor;
wherein the motor comprises a motor shaft and a switch;
wherein the motor shaft is connected to the scaling cylinder such that the motor will rotate the scaling cylinder;
wherein the switch controls electric current flow into the motor.

4. The tool for processing fish according to claim 3 wherein the switch is mounted on the handle in an accessible manner.

5. The tool for processing fish according to claim 4 wherein the motor is mounted in the first end of the handle such that the motor shaft projects through an aperture formed in the first end of the handle.

6. The tool for processing fish according to claim 5 wherein the switch and the motor are connected in series with the power source.

7. The tool for processing fish according to claim 6 wherein the power source further comprises a battery.

8. The tool for processing fish according to claim 7 wherein the power source further comprises a port;
wherein the port is mounted on the handle;
wherein the port is adapted to receive electricity from an external DC power source.

9. The tool for processing fish according to claim 8 wherein the terminals of the port are wired in parallel to the battery.

10. The tool for processing fish according to claim 9 wherein the power source further comprises a diode;
wherein the diode is inserted between the battery and the port such that the diode prevents the discharge of electricity from the battery through the port.

11. The tool for processing fish according to claim 10 wherein the scaling cylinder is molded as a single unit from plastic;
wherein the hood and the handle are molded as a single unit from plastic;
wherein the removable cap is molded as a single unit from plastic.

* * * * *